United States Patent
Richardson

(10) Patent No.: US 9,607,756 B2
(45) Date of Patent: Mar. 28, 2017

(54) TRANSFORMER FOR AN INVERTER SYSTEM AND AN INVERTER SYSTEM COMPRISING THE TRANSFORMER

(75) Inventor: Robert Richardson, Chelmsford Essex (GB)

(73) Assignee: E2V TECHNOLOGIES (UK) LIMITED, Chelmsford, Essex (GB)

( * ) Notice: Subject to any disclaimer, the term of this patent is extended or adjusted under 35 U.S.C. 154(b) by 474 days.

(21) Appl. No.: 14/131,619

(22) PCT Filed: Jul. 4, 2012

(86) PCT No.: PCT/GB2012/051563
§ 371 (c)(1),
(2), (4) Date: Mar. 6, 2014

(87) PCT Pub. No.: WO2013/007984
PCT Pub. Date: Jan. 17, 2013

(65) Prior Publication Data
US 2014/0268968 A1 Sep. 18, 2014

(30) Foreign Application Priority Data
Jul. 8, 2011 (GB) .................................. 1111727.2

(51) Int. Cl.
*H01F 27/36* (2006.01)
*H02M 7/44* (2006.01)
*H01F 27/42* (2006.01)

(52) U.S. Cl.
CPC .......... *H01F 27/362* (2013.01); *H01F 27/42* (2013.01); *H02M 7/44* (2013.01)

(58) Field of Classification Search
CPC .......... H01F 27/362; H01F 27/42; H02M 7/44
See application file for complete search history.

(56) References Cited

U.S. PATENT DOCUMENTS

| 2,878,441 | A | 3/1959 | Rogers et al. |
| 3,963,975 | A | 6/1976 | Gauper et al. |

(Continued)

FOREIGN PATENT DOCUMENTS

| EP | 0 130 124 A1 | 1/1985 |
| EP | 0 429 315 A3 | 5/1991 |

(Continued)

OTHER PUBLICATIONS

English Translation of Japanese Office Action in corresponding Japanese Application.

(Continued)

*Primary Examiner* — Jue Zhang
(74) *Attorney, Agent, or Firm* — FisherBroyles, LLP; Robert Kinberg

(57) ABSTRACT

A transformer includes a primary winding; a secondary winding; a first electrostatic screen located between the primary winding and the secondary winding and most proximate to the primary winding; and a second electrostatic screen located between the primary winding and the secondary winding and most proximate to the secondary winding. The first electrostatic screen is electrically connectable to a power supply electrically connectable to the primary winding and the second electrostatic screen is electrically connectable to a load electrically connectable to the secondary winding. The invention also includes an inverter system including the transformer.

28 Claims, 4 Drawing Sheets

(56) References Cited

U.S. PATENT DOCUMENTS

| | | | |
|---|---|---|---|
| 4,089,049 A | 5/1978 | Suzuki et al. | |
| 4,333,900 A | 6/1982 | Carey | |
| 4,518,941 A | 5/1985 | Harada | |
| 6,377,153 B1 | 4/2002 | Yamanaka et al. | |
| 2003/0030534 A1* | 2/2003 | Gu | H01F 27/367 336/221 |
| 2009/0115564 A1 | 5/2009 | Minteer | |
| 2011/0164441 A1 | 7/2011 | Richardson | |
| 2011/0216568 A1 | 9/2011 | Koyama et al. | |

FOREIGN PATENT DOCUMENTS

| | | |
|---|---|---|
| EP | 1 085 536 A1 | 3/2001 |
| EP | 1 284 487 A2 | 2/2003 |
| GB | 392896 | 8/1931 |
| GB | 760455 | 10/1956 |
| GB | 1 373 683 | 11/1974 |
| GB | 1 545 58 | 5/1979 |
| GB | 2462291 A8 | 2/2010 |
| JP | 51-144911 A | 12/1976 |
| JP | 51144911 A * | 12/1976 |
| JP | 58-77212 A | 5/1983 |
| JP | 58-102509 A | 6/1983 |
| JP | 62-201914 U | 12/1987 |
| JP | 2010-119188 A | 5/2010 |
| WO | WO-02/084679 A1 | 10/2002 |
| WO | 2010/013049 A1 | 2/2010 |

OTHER PUBLICATIONS

International Search Report issued in PCT/GB2012/051563, dated Feb. 5, 2013.
United Kingdom Search Report issued in GB1111727.2 dated Oct. 17, 2011.
Examination Report issued in United Kingdom Application No. GB1111727.2 dated Feb. 26, 2015.

* cited by examiner

TRANSFORMER FOR AN INVERTER SYSTEM AND AN INVERTER SYSTEM COMPRISING THE TRANSFORMER

This invention relates to a transformer for an inverter system and an inverter system comprising the transformer.

BACKGROUND

Modern power electronics systems, that require conversion of AC power from an electricity utility company AC supply to DC power for use by a process, frequently use a Switched Mode Power Supply (SMPS) for the required inversion.

A typical known SMPS 10 as illustrated in FIG. 1 comprises an inverter 11 which has input ports electrically connected by first leads 120 to an AC energy source 12 to generate a higher frequency AC inverter drive waveform 112, shown in a first inset 111 of FIG. 1, which is fed from an output of the inverter 11 via second leads 110 towards a 1:N XFMR transformer rectifier unit 13. A secondary winding 133 of the transformer is connected by leads 130 to Dn diodes 14 to provide a desired DC voltage trace 162, shown in a second inset 161 of FIG. 1, across a load 16. For reasons explained below, an L1 common mode inductor 18 is connected in series between the inverter 11 and the transformer rectifier unit 13, so that the output leads 110 from the inverter are connected to an input of the L1 common mode inductor 18 and output leads 150 from the inductor 18 electrically connect the inductor 18 to a primary winding 131 of the transformer 13.

As shown in FIG. 1, a first stray capacitance Cs1 exists between earth and the first leads 120 connecting the energy source 12 to the inverter 11. A second stray capacitance Cs2a exists between the primary winding 131 and a core or former 132 of the transformer rectifier unit 13. A third stray capacitance Cs3a exists between the primary winding 131 and the secondary winding 133 of the transformer rectifier unit 13 and a fourth stray capacitance Cs4a exists between the core or former 132 and the secondary winding 133 of the transformer rectifier unit 13.

The Dn diodes 14 are connected across the output terminals of the secondary winding, typically, but not restricted to, a bridge rectifier arrangement, 133 and an Rmon monitor resistance 15 is connected in series between earth and a first terminal of the Dn diodes 14 connected to a first output terminal of the secondary winding 133, to monitor load current pulses, a corresponding voltage trace 152 across the monitor resistance 15 being illustrated in a third inset 151 of FIG. 1. The load 16 is connectable between the second output terminal of the Dn diodes 14 and earth.

With high power systems, for example with a DC output power above 30 kW, the SMPS 10 and the XFMR transformer rectifier unit 13 with diodes 14 can be physically large, for example greater than 250 liters, so that stray capacitances Cs1 and Cs2a to Cs4a of the various component parts are significant, for example greater than 10 nF.

Separation between such large volume items is also typically large, for example 3 meters or more, and with this length of electrical connectors 110, 120, 130, 150 therebetween, stray inductance of, for example, 2 or 3 µH is introduced.

The inverter drive waveforms 112 are pulsed and their rise and fall times Tr and Tf, can be relatively rapid, for example of the order of 1 µs or less. The inverter output peak voltages ±Epk, shown in the first inset 111, typically have values up to 1 kV.

Stray currents I are related to the stray capacitance C and rise and fall rates dV/dt by the formula:

$$I = C*dV/dt,$$

so for 10 nF stray capacitance and a 1 µs rise time from zero to 1 kV, the peak resultant stray current is of the order of 10 A.

These stray currents flow through the connector leads 110, 120, 130, 150 which, as indicated above, are typically several meters long, presenting a very high risk of EMC problems, both internal to subsystems of the inverter and externally to co-located or adjacent equipment.

As shown in FIG. 1, in an attempt to reduce the impact of this stray current, an L1 common mode choke 18 is often used between the inverter 11 and the transformer rectifier unit 13 to reduce an amplitude of first stray current pulses, Is1a, that flow in a loop from earth through the first stray capacitance Cs1, the inverter 11 and via the second and third stray capacitances Cs2a, Cs3a, the XFMR windings 132, 133 and the Rmon monitor resistor 15 back to earth.

In applications where inverters are used to drive electric motors, these currents flowing in stray capacitances have been known to be sufficient to damage insulation and bearings of the motor. Moreover, unlike a motor, the diodes Dn of an XFMR provide a potential source of a second stray current Is2a.

There are many well-known arrangements of rectifiers for converting AC signals to DC signals or uni-directional pulses. In all cases, as the current in the Dn rectifier diodes 14 falls to zero and the voltage across them reverses, a "recovery current", as the diode re-establishes reverse voltage blocking, can produce very rapid transients. These reverse currents form a second stray current Is2a that flows through the fourth stray capacitance Cs4, the secondary winding 133 of XFMR transformer 13 and the Rmon monitor resistance 15 to add to the problem of undesirable noise voltages.

The net result, at the very least, is that the voltage across Rmon monitor resistance 15 is distorted with significant transient voltages Vb and −Vc on the leading and trailing edges of the pulses as shown in the third inset 151 of FIG. 1. This can disturb current monitoring signals that may be required to be monitored precisely for process control, and, in addition, the voltages developed across the stray capacitances Cs1 and Cs2a to Cs4a of residual elements may put excessive stress on dielectric materials used in the construction of XFMR transformer 13.

Furthermore, the stray capacitances Cs2a to Cs4a are not simple capacitances in that they represent the capacitance of transformer windings to surrounding structures and as such will have significant inductance in series with the capacitance. This further complicates the situation and it is frequently found that transient voltages Vb and Vc in the Rmon monitoring resistance 15 manifest themselves as large amplitude, high frequency, typically 0.2 to 5 MHz, damped oscillations that can persist for a large portion of a pulse duration.

The use of an electrostatic screen in a transformer is known: for example, in a transformer described in the Applicant's international patent application WO 2010/013049, such an electrostatic screen is used. However, this is not completely effective in the present application because there are two predominant paths as described above in which the currents Is1a and Is2a in stray capacitances Cs1 and Cs2a to Cs4a can flow.

It is desirable to reduce effects of these stray currents.

BRIEF SUMMARY OF THE DISCLOSURE

In accordance with a first aspect of the present invention there is provided a transformer comprising: primary winding means; secondary winding means; first electrostatic screen means located between the primary winding means and the secondary winding means and most proximate to the primary winding means; and second electrostatic screen means located between the primary winding means and the secondary winding means and most proximate to the secondary winding means, wherein the first electrostatic screen means is electrically connectable directly by a first lossy impedance to a power supply electrically connectable to the primary winding means and the second electrostatic screen means is electrically connectable directly by a second lossy impedance to a load electrically connectable to the secondary winding means.

Conveniently, the transformer further comprises at least one rectifying means connected across the secondary winding means wherein the second electrostatic screen means is electrically connectable to the at least one rectifying means.

Advantageously, the first electrostatic screen means is connectable to the power supply via a first lossy impedance and the second electrostatic screen means is connectable to the load or the at least one rectifying means, respectively, via a second lossy impedance.

Conveniently the secondary winding means comprises a plurality of coaxially arranged toroidal closed magnetic circuit means connected in series on a common axis within an enclosure means; the primary winding means comprises a plurality of turns including electrically conducting members passing axially through the toroidal closed magnetic circuit means electrically connected respectively to electrically conducting strip line means located on outer faces of walls of the enclosure means to form a continuous electrical conductor, and the first and second electrostatic screen means, located between the primary winding means and the secondary winding means, are provided by layered members comprising an insulating support layer sandwiched between first and second electrically conducting layers.

Conveniently, the first electrostatic screen means comprises an inner electrically conducting layer of a tubular first layered member located between the electrically conducting members forming a portion of the primary winding means passing axially through the toroidal closed magnetic circuit means and the toroidal closed magnetic circuit means forming the secondary winding means and outer electrically conducting layers of respective planar layered members located on inner faces of the enclosure means opposed to the outer faces along which the electrically conducting strip line means forming a further portion of the primary winding means are located.

Conveniently, the second electrostatic screen means comprises an outer electrically conducting layer of the tubular first layered member and inner electrically conducting layers of the respective planar layered members.

Conveniently, the tubular layered member comprises a first longitudinal slit in the first electrically conducting layer and a second longitudinal slit in the second electrically conducting layer to minimise eddy currents in the tubular layered member.

Advantageously, the first longitudinal slit is circumferentially offset from the second longitudinal slit.

Conveniently, the electrically conducting members forming a first portion of the primary winding are mutually spaced apart such that cross-sections of the electrically conducting members lie substantially on a circumference of a circle on a transverse cross-section of the enclosure means.

Conveniently, the electrically conducting members forming the first portion of the primary winding are at least one of tubes, rods and strip conductors.

Advantageously, the electrically conducting members forming the first portion of the primary winding are tubes with a wall thickness comparable to a skin depth of the electric current carried thereby at an operating frequency of the transformer.

Alternatively, the electrically conducting members forming the first portion of the primary winding are flat strip conductors that have a thickness comparable to a skin depth of the electric current carried thereby at an operating frequency of the transformer.

Advantageously, the electrically conducting members forming the first portion of the primary winding comprise a combination of electrically conducting members connected in parallel, each conducting member with a wall thickness comparable to a skin depth of the electric current carried thereby at an operating frequency of the transformer.

Conveniently, the electrically conducting strip line means forming a second portion of the primary winding are formed in printed circuit boards located on outer faces of walls of the enclosure means.

Conveniently, the enclosure means has a substantially rectilinear transverse cross-section and the walls of the enclosure means parallel to a longitudinal axis of the enclosure means are substantially planar.

Conveniently, the electrically conducting strip line means forming the second portion of the primary winding are located on first, second and third walls of the substantially planar walls of the enclosure means and have a thickness greater than a skin depth at an operating frequency of the transformer.

Conveniently, a fourth substantially planar wall of the enclosure means comprises a printed circuit board for rectifying means.

Advantageously, the transformer further comprises insulating tube means on which the secondary toroidal closed magnetic circuit means are located arranged to provide voltage hold off for the electrically conducting members forming the first portion of the primary winding passing axially through the toroidal closed magnetic circuit means.

Advantageously, the transformer further comprises coolant distribution means.

Conveniently, the coolant distribution means comprises tube means, coaxial with, and of smaller diameter than, core apertures of the toroidal closed magnetic circuit means, the tube means being supplied with bleed hole apertures to direct the coolant towards respective secondary toroids.

Advantageously, the transformer further comprises electrically insulating sheet means located between the toroidal closed magnetic circuit means and the planer twin-thin walled members to provide high voltage insulation and minimise a risk of high voltage tracking across a surface of the insulator.

Conveniently, the individual secondary toroidal closed magnetic circuit means are interconnected such that each secondary toroidal closed magnetic circuit means of the transformer is star connected and provides an input to a two pulse rectifier.

Conveniently the transformer is arranged for three-phase current and comprises a first, a second and a third primary winding means and a corresponding first, second and third secondary winding means arranged for the three phases respectively, and a first and second electrostatic screen means between the first primary and secondary winding means, a third and fourth electrostatic screen means between the second primary and secondary winding means and a fifth and sixth electrostatic screen means between the third primary and secondary winding means wherein the first, third and fifth electrostatic screen means are electrically interconnected and the second, fourth and sixth electrostatic screen means are electrically interconnected.

According to a second aspect of the invention there is provided an inverter system comprising a transformer as described above.

Conveniently, in the inverter system output ports of an inverter are electrically connected to the primary winding means of the transformer and the first electrostatic screen means is electrically connected to an input port of the inverter via a first impedance such that a first stray current flowing through a first stray capacitance between the primary winding means and the first electrostatic screen means flows through the first impedance to the inverter.

Advantageously, the first impedance is sufficiently lossy that substantially all of the energy associated with the first stray current is dissipated in the first impedance.

Conveniently, output ports of the inverter are electrically connected to the primary winding means via an inductance forming a common mode choke between the inverter and primary winding means.

Conveniently, at least one rectifying means is electrically connected across the secondary winding means of the transformer and the second electrostatic screen means is electrically connected to the at least one rectifying means via a second impedance such that a second stray current flowing through a second stray capacitance between the secondary winding means and the second electrostatic screen means flows through the second impedance and the at least one rectifying means Advantageously, the second impedance is sufficiently lossy that substantially all of the energy associated with the second stray current is dissipated in the second impedance.

Conveniently, a monitor resistance is connected in series with a load electrically connectable to the secondary winding of the transformer to monitor a current passing through the load, and at least one of the first and second electrostatic screen means substantially prevents a first stray current which passes thorough a first stray capacitance between the primary winding means and the first electrostatic screen means and a second stray current which passes thorough a second stray capacitance between the secondary winding means and the second electrostatic screen means respectively from also passing through the monitor resistance.

According to a third aspect of the invention, there is provided a three-phase inverter system, comprising three individual and isolated transformers as described above, wherein the primary winding means of the transformers are delta connected and arranged to be fed from a three-phase inverter.

Conveniently, the secondary toroidal closed magnetic circuit means of the three individual and isolated transformers are interconnected such that each secondary toroidal closed magnetic circuit means of a transformer is star connected and provides an input to a six pulse rectifier.

BRIEF DESCRIPTION OF THE DRAWINGS

Embodiments of the invention are further described hereinafter with reference to the accompanying drawings, in which.

DETAILED DESCRIPTION

Figure 1:
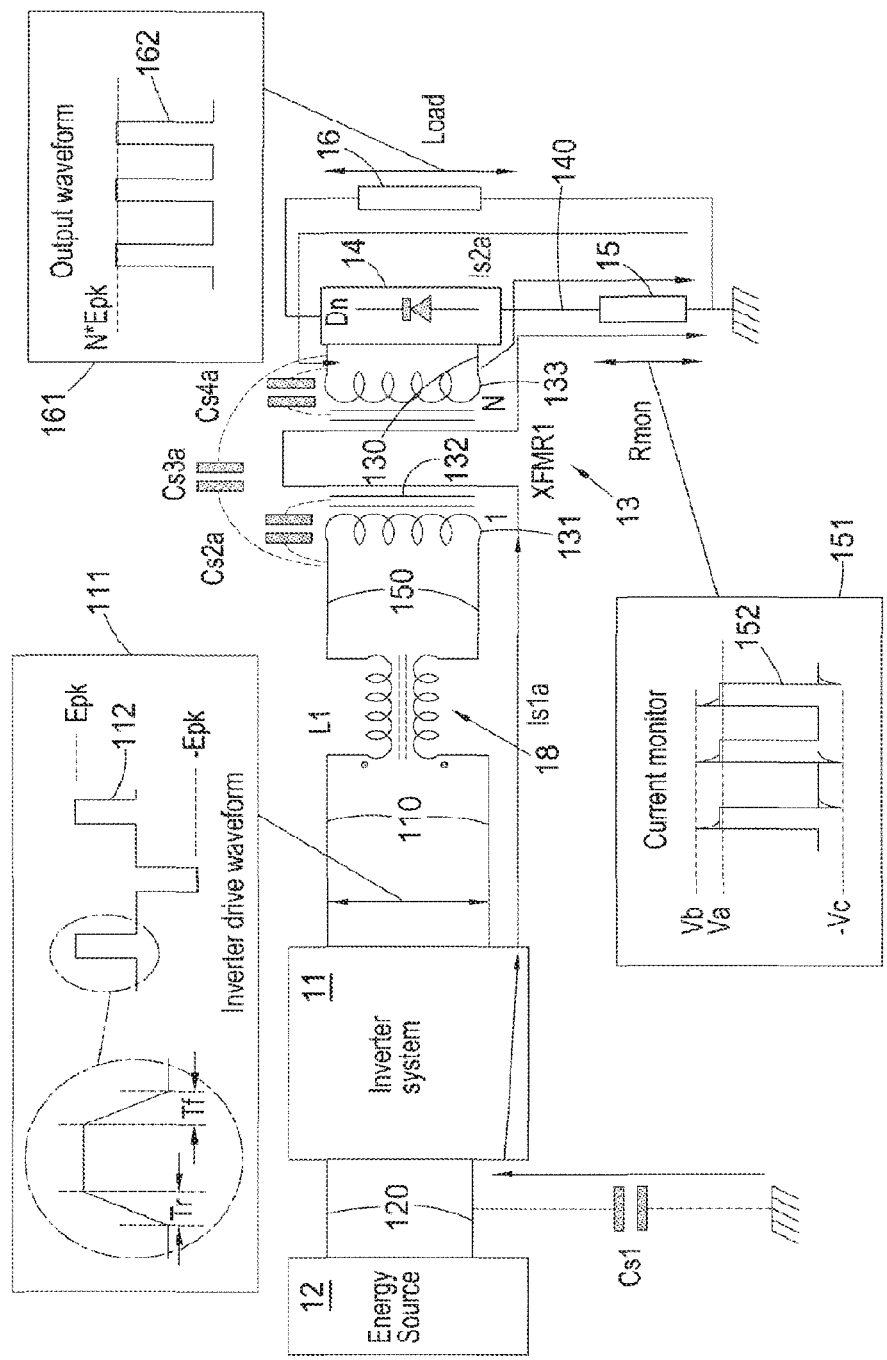
FIG. 1 is a schematic diagram of a known Switched Mode Power Supply.
Figure 2:
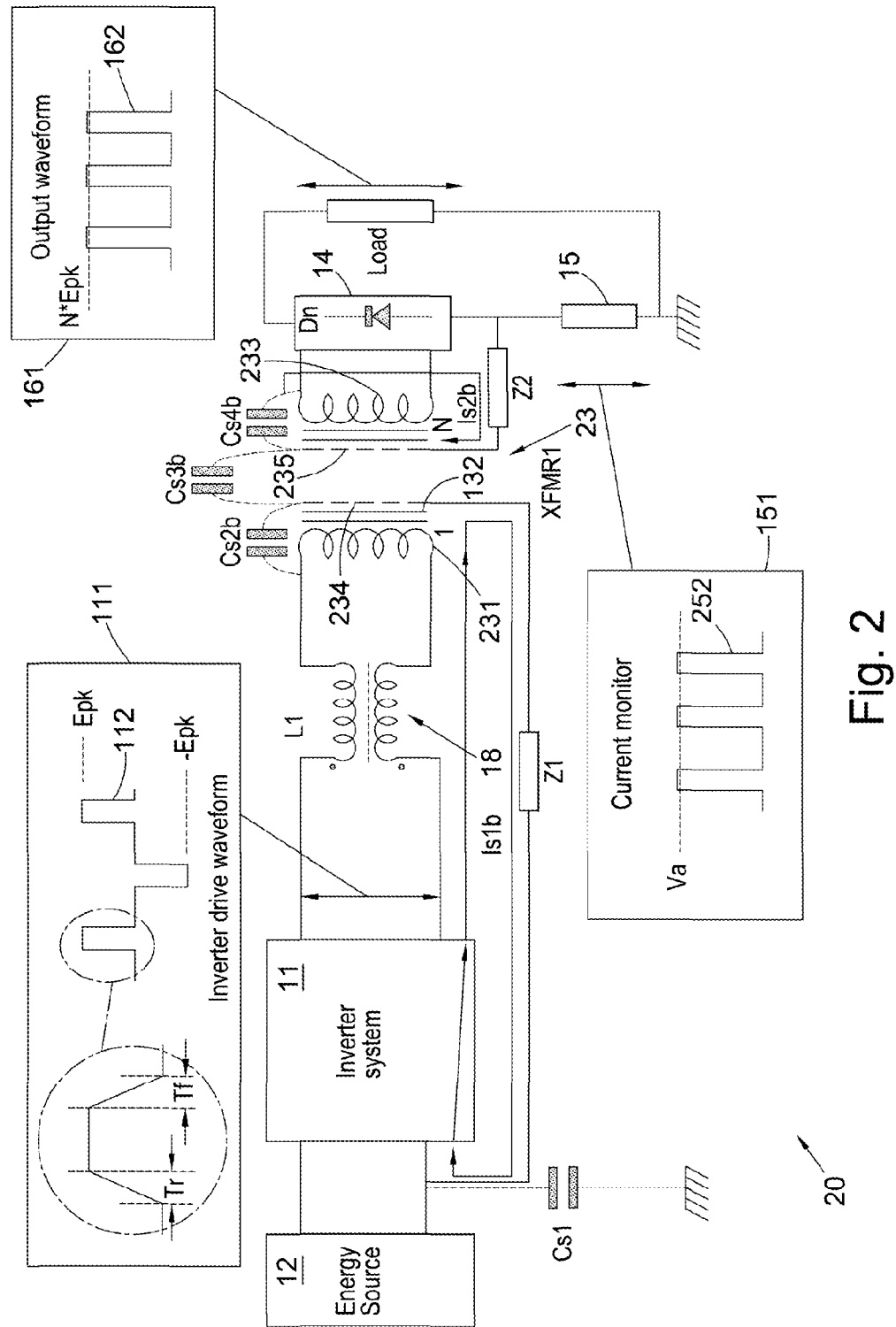
FIG. 2 is a schematic diagram of a Switched Mode Power Supply according to a first embodiment of the invention.

In a Switched Mode Power Supply (SMPS) 20 according to the invention, illustrated in a simplified form in FIG. 2, the arrangement is basically the same as in FIG. 1, and the same or corresponding reference signs are used for the same or corresponding components respectively where appropriate. However, in addition, the transformer rectifier unit 23 of SMPS 20 differs from the known transformer rectifier unit of SMPS 10 of FIG. 1 by being provided with first and second electrostatic screens 234, 235. The first electrostatic screen 234 is within the core 132 located between the primary winding 231 and the secondary winding 233, but proximate the primary winding 231 and the second electrostatic screen 235 is located within the core 132 between the primary winding and the secondary winding, but proximate the secondary winding of the transformer 23. Moreover, a first impedance Z1 is electrically connected between the first electrostatic screen 234 and an input of the inverter 11. A second impedance Z2 is electrically connected between the second electrostatic screen 235 and a node between the rectifier diodes 14 and the current monitor resistor 15. The first and second electrostatic screens 234, 235 allow separate return paths in which stray currents may flow. The first stray current Is1b can now be made to flow back to its primary source, the inverter 11, via the first impedance Z1 and the inductance L1 as a common mode choke 18, instead of through the secondary winding and monitor resistance 15 to earth, as in the prior art of FIG. 1. Similarly the rectifier commutation current spikes Is2b can be made to flow around the secondary winding circuit 233 via the second Impedance Z2, instead of flowing through the monitor resistance 15 as in FIG. 1. Thus the effect of the stray currents on the current monitor resistance 15 are avoided, or at least significantly reduced, as shown in the voltage trace 252 of the third inset 251 of FIG. 2.

As described above in reference to FIG. 1, the capacitance paths, though now controlled by the electrostatic screens 234, 235 do have series inductance due to the distributed nature of the windings 231, 233.

To provide adequate damping, the impedances L1, Z1, and Z2 should be made lossy, so that the energy associated with the stray currents is dissipated as heat in these components.

Figure 3:
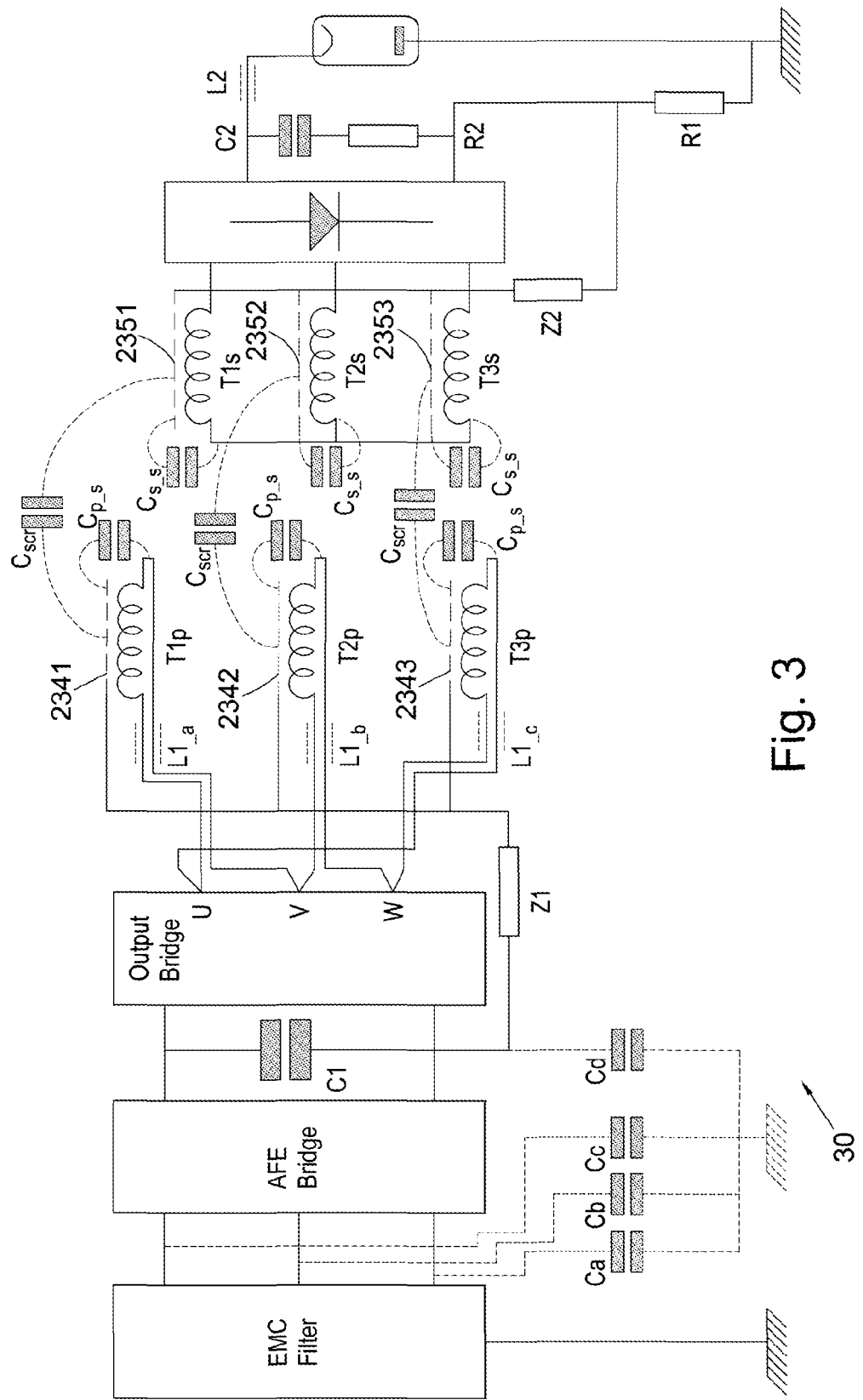
FIG. 3 is a schematic diagram of a three-phase Switched Mode Power Supply according to a second embodiment of the invention.

High power systems typically use multiphase, often 3-phase, inverter systems. FIG. 3 shows an embodiment of an inverter system according to the invention for a 3-phase system such as described in international patent application WO 2008/149133. In this arrangement each transformer limb T1p:T1s, T2p:T2s and T3p:T3s has a first electrostatic screen 2341, 2342, 2343 proximate each of the primary windings T1p, T2p and T3p respectively and a second electrostatic screen 2351, 2352, 2353 proximate each of the secondary windings T1s, T2s and T3s respectively. The first electrostatic screens for the primary windings are paralleled as are the second electrostatic screens for the secondary windings and then each of these is fed via a common control impedance Z1 and Z2 to its appropriate return path. That is, a first impedance Z1 is connected between the primary winding first electrostatic screens 2341, 2342, 2343 and an input of the output bridge respectively and a second impedance Z2 is electrically connected between the secondary winding second screens 2351, 2352 and 2353 and a node between the monitor resistance R1 and the load. Thus stray currents do not pass through the monitor resistance R1.

The connections U, V, and W via the inductances $L1\_n$ are implemented as in the Applicant's co-pending UK patent application GB 1101066.7, a copy of which is filed herewith.

Thus for a three-phase application, a suitable arrangement of cables uses a pair of cables per lead and each go and return pair for each of the phases is grouped together and the common mode inductors $L1_a$, $L1_b$ and $L1_c$ are arranged on each phase grouping of leads. The inductance formed by the loops having phased sources U, V and W and the load should be minimised. Thus each individual lead may be formed of a pair of parallel 4 mm$^2$ 1.1 kV rated SIWO-KUL™ cables with four cables closely grouped in a bundle and sleeved together. Suppression cores of type RS 239-062 may be fitted over the sleeved bundle of four cables to clamp the cables together and provide the common mode inductor or choke.

To implement the electrostatic screens ES a modification to the transformer as described in patent application WO 2010/013049 is applied. A cross-section of this modified transformer is shown in FIG. 4.

Figure 4:
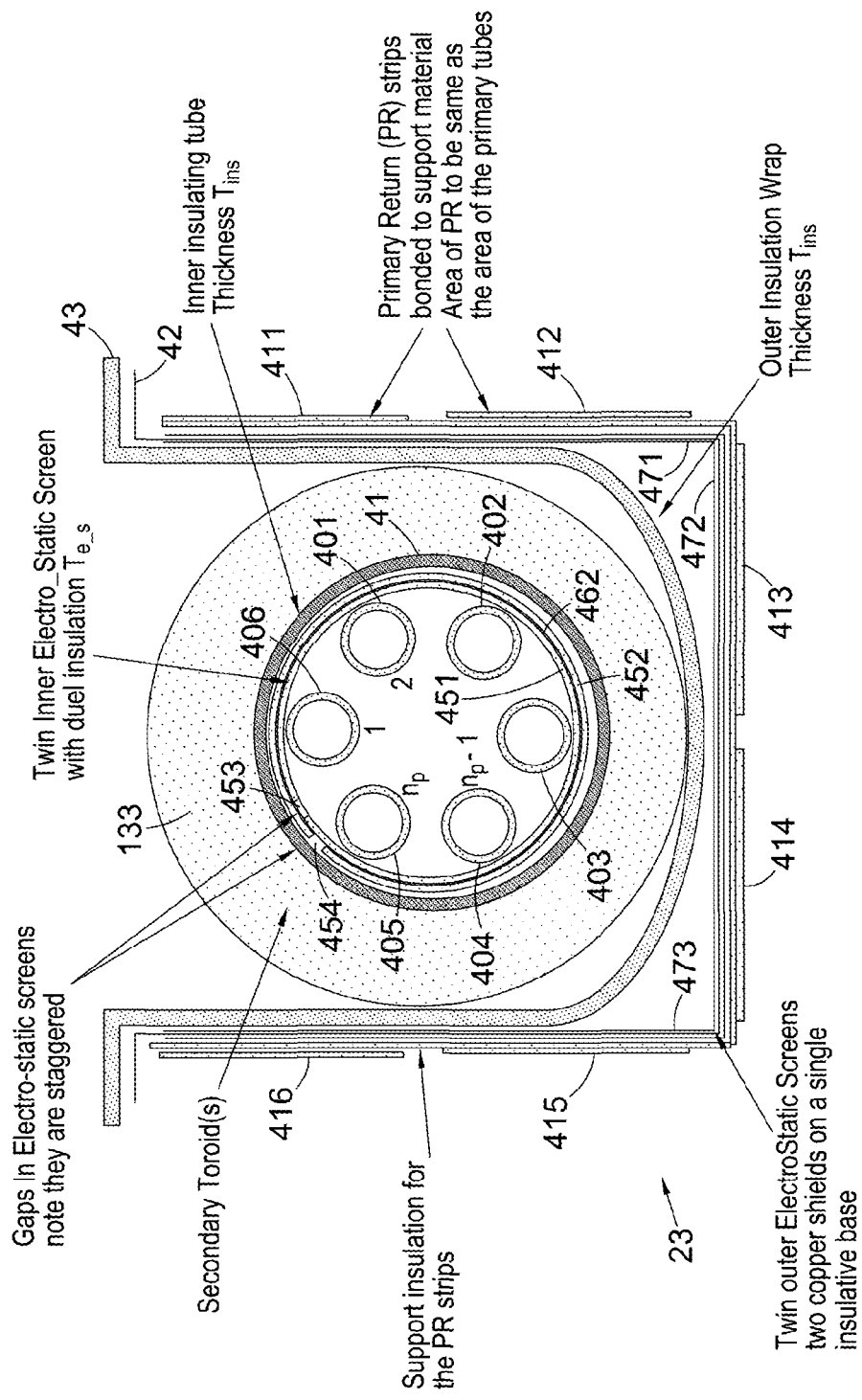
FIG. 4 is a schematic cross-section of a transformer suitable for use in the three-phase Switched Mode Power Supply of FIG. 2 or 3.

FIG. 4 shows a simplified transverse cross-section of the assembled transformer 23. An inner insulating tube 41 is used to locate secondary toroids 133 coaxially on the insulating tube and to provide voltage hold off for electrically conducting tubes or rods 401-406 of primary turns 131 located longitudinally within the inner insulating tube 41. The inner insulating tube 41 and secondary toroids 133 are located longitudinally in an elongate insulating trough 42. The primary winding 131 comprises the tubes or rods 401-406 electrically connected to electrically conducting longitudinal strip lines 411-416 located on outer walls of the trough 42. As shown in FIG. 4, twin inner tubular electrostatic screens with dual tubular insulation are located between the primary winding 401-406 and secondary windings 133, which is provided by two thin-walled metallic sleeves 451, 452 on inner and outer faces respectively of the outer sleeve 461 of the twin inner insulating sleeves 461, 462. That is, a portion of the first electrostatic screen 451 is provided between the inner and outer insulating sleeves 461, 462 and a portion of the second electrostatic screen 452 is provided on the outer face of the outer insulating sleeve 462 of the inner insulating sleeves 461, 462 to screen the first portion of the primary winding formed by the rods or tubes 401-406 from the secondary toroids 133. Offset longitudinal slits 453, 454 are provided in the inner and outer thin-walled metallic sleeves 451, 452 respectively, to minimize eddy currents in the electrostatic screens 451, 452. A further single sheet 43 of suitable insulating material is located between the toroids 133 and inner walls of the enclosure 42 to provide an outer insulation wrap. This material can be simply formed or bent into position to provide a required high voltage clearance and high voltage tracking distance. The fourth side of the trough houses a more conventional PCB, not shown, on which, for example, any required rectifier diodes and filter components 45, 46 are installed.

However, to be fully effective the screening between the primary and secondary windings also needs to shield return strips 411-416, which form a second portion of the primary winding, from the secondary winding 133. FIG. 4 shows an additional three twin outer planar electrostatic screens 471, 472 and 473. These return strips may be thin copper sheets (20 µM thickness would be suitable) and are serially connected by electrically conducting links (not shown) to the tubes or rods 401-406. The electrostatic screens 451, 452 and the screen assembly 471, 472 and 473 are electrically connected by wire links at a low voltage end of the transformer to form the circuits shown in FIG. 2 for the stray currents Is1$b$ and Is2$b$. Thus, it will be understood that the innermost metal layer 451 of the inner electrostatic sleeve is electrically connected to the outermost metal layer of the outer electrostatic sleeve 471, 472, 473 to form a primary winding screen 234 most proximate to the primary winding 401-406, 411-416. It will be further understood that the outermost metal layer 452 of the inner electrostatic sleeve is electrically connected to the innermost metal layer of the outer electrostatic sleeves 471, 472, 473 to form a secondary winding screen 235 most proximate to the secondary winding 133. It will be further understood that the primary winding screen 234 is electrically connectable via a first impedance Z1 to an input of an inverter 11 connectable to the primary winding 231 and that the secondary winding screen 235 is electrically connectable via a second impedance Z2 to a node between diodes 14 connectable to the secondary winding and a monitor resistance 15 connectable between the node and earth.

The screens 471, 472 and 473 may alternatively be realized using printed circuit boards with, for example, 70 µm thick copper conductors (2 oz/ft$^2$) on 1.6 mm thick glass fibre reinforced polymer (GFRP) single-sided copper printed circuit board material to replace the trough-like enclosure 42. The inner face of copper is used as the screen while the outer face of the printed circuit board material may have the return strips 411-416 bonded/etched into/onto the printed circuit board material, thereby forming double-sided printed circuit boards.

Referring to FIG. 4, the trough structure 42 minimizes coupling between an inside and outside of the transformer 200, 201. The trough structure 42 also reduces leakage inductance to a minimum allowed by required spacing for voltage and current input and output requirements of the transformer. This low coupling characteristic is desirable in a 3-phase application of the apparatus.

It is desirable that the increased stray capacitance due to the screens is minimized. In this regard the use of Formex™ Polypropylene sheeting is suitable. The dielectric constant of the Formex™ material is approximately 2.3 while FR4 based material used in the transformer of WO 2010/013049 has a dielectric constant of 4.5.

It is also desirable that the support insulation 420 for the primary winding strip lines 411-416 has as low a dielectric constant as possible. The use of Formex™ Polypropylene or PTFE is suitable for this purpose.

For the twin outer electrostatic screen 1.6 mm Formex™ with copper laminated to each side to form each screen using 0.05 mm (0.002") copper foil is suitable.

The twin inner electrostatic tubular screens may be formed using the same base materials namely 1.6 mm Formex™ with each side laminated with the 0.05 mm (0.002") copper foil. A further outer wrap of between 0.5 mm or 1 mm Formex™ provides the twin electrostatic screens with dual insulation.

Use of the double copper laminated 1.6 mm Formex™ for two end screens for the trough 42 are also suitable.

The invention provides the advantage in high power equipment in which the voltages Epk, switching times Tr and Tf and stray capacitances Cs1 and Cs2a to Cs4a cannot be readily reduced, of confining consequential stray currents to known paths where their energy can be dissipated safely without producing EMC and electric stress problems and without interfering with a monitoring voltage.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. An inverter system comprising:
   a transformer comprising:
      a primary winding;
      a secondary winding;
      a first electrostatic screen located between the primary winding and the secondary winding and most proximate to the primary winding; and
      a second electrostatic screen located between the primary winding and the secondary winding and most proximate to the secondary winding, wherein the first electrostatic screen is electrically connectable directly by a first lossy impedance to a power supply electrically connectable to the primary winding and the second electrostatic screen is electrically connectable directly by a second lossy impedance to a load electrically connectable to the secondary winding; and
   an inverter including output ports electrically coupled to the primary winding of the transformer and input ports electrically coupled to the first electrostatic screen via the first impedance such that a first stray current flowing through a first stray capacitance between the primary winding and the first electrostatic screen flows through the first impedance to the inverter, wherein the first impedance is sufficiently lossy that substantially all of the energy associated with the first stray current is dissipated in the first impedance.

2. The inverter system as claimed in claim 1, further comprising at least one rectifier electrically coupled across the secondary winding, wherein the second electrostatic screen is electrically coupled to the at least one rectifier.

3. The inverter system as claimed in claim 1, wherein the second electrostatic screen is connectable to the load or the at least one rectifier, respectively, via a second lossy impedance.

4. The inverter system as claimed in claim 1, wherein:
   the secondary winding comprises a plurality of coaxially arranged toroidal closed magnetic circuits connected in series on a common axis within an enclosure;
   the primary winding comprises a plurality of turns including electrically conducting members passing axially through the toroidal closed magnetic circuits electrically connected respectively to electrically conducting strip lines located on outer faces of walls of the enclosure to form a continuous electrical conductor; and
   the first and second electrostatic screens, located between the primary winding and the secondary winding include layered members comprising an insulating support layer sandwiched between first and second electrically conducting layers.

5. The inverter system as claimed in claim 4, wherein the first electrostatic screen means comprises an inner electrically conducting layer of a tubular first layered member located between the electrically conducting members forming a portion of the primary winding passing axially through the toroidal closed magnetic circuit and the toroidal closed magnetic circuit forming the secondary winding and outer electrically conducting layers of respective planar layered members located on inner faces of the enclosure opposed to the outer faces along which the electrically conducting strip lines forming a further portion of the primary winding are located.

6. The inverter system as claimed in claim 5, wherein the second electrostatic screen comprises an outer electrically conducting layer of the tubular first layered member and inner electrically conducting layers of the respective planar layered members.

7. The inverter system as claimed in claim 4, wherein the tubular layered member comprises a first longitudinal slit in the first electrically conducting layer and a second longitudinal slit in the second electrically conducting layer to minimise eddy currents in the tubular layered member.

8. The inverter system as claimed in claim 7, wherein the first longitudinal slit is circumferentially offset from the second longitudinal slit.

9. The inverter system as claimed in claim 4, wherein the electrically conducting members forming a first portion of the primary winding are mutually spaced apart such that cross-sections of the electrically conducting members lie substantially on a circumference of a circle on a transverse cross-section of the enclosure.

10. The inverter system as claimed in claim 4, wherein the electrically conducting members forming a first portion of the primary winding are at least one of tubes, rods and strip conductors.

11. The inverter system as claimed in claim 10, wherein the electrically conducting members forming the first portion of the primary winding are tubes with a wall thickness comparable to a skin depth of the electric current carried thereby at an operating frequency of the transformer.

12. The inverter system as claimed in claim 10, wherein the electrically conducting members forming the first portion of the primary winding are flat strip conductors and have a thickness comparable to a skin depth of the electric current carried thereby at an operating frequency of the transformer.

13. The inverter system as claimed in claim 4, wherein the electrically conducting members forming the first portion of the primary winding comprise a combination of electrically conducting members connected in parallel, each conducting member with a wall thickness comparable to a skin depth of the electric current carried thereby at an operating frequency of the transformer.

14. The inverter system as claimed in claim 4, wherein the electrically conducting strip lines forming a second portion of the primary winding are formed in printed circuit boards located on outer faces of walls of the enclosure.

15. The inverter system as claimed in claim 4, wherein the enclosure has a substantially rectilinear transverse cross-section and the walls of the enclosure are parallel to a longitudinal axis of the enclosure and are substantially planar.

16. The inverter system as claimed in claim 15, wherein the electrically conducting strip lines are located on first, second and third walls of the substantially planar walls of the enclosure and have a thickness greater than a skin depth at an operating frequency of the transformer.

17. The inverter system as claimed in claim 16, including a fourth substantially planar wall of the enclosure comprising a printed circuit board including a rectifier.

18. The inverter system as claimed in claim 4, comprising an insulating tube on which the secondary toroidal closed magnetic circuits are located arranged to provide voltage hold off for the electrically conducting members which pass axially through the toroidal closed magnetic circuits.

19. The inverter system as claimed in claim 4, comprising a coolant distribution system.

20. The inverter system as claimed in claim 19, wherein the coolant distribution system comprises a tube, coaxial with, and of smaller diameter than, core apertures of the toroidal closed magnetic circuits, the tube being supplied with bleed hole apertures to direct the coolant towards respective secondary toroids.

21. The inverter system as claimed in claim 4, comprising electrically insulating sheets located between the toroidal closed magnetic circuits and the planer twin-thin walled members to provide high voltage insulation and minimise a risk of high voltage tracking across a surface of the insulator.

22. The inverter system as claimed in claim 4, wherein the individual secondary toroidal closed magnetic circuits are interconnected such that each secondary toroidal closed magnetic circuit of the transformer is star connected and provides an input to a two pulse rectifier.

23. The inverter system as claimed in claim 1, arranged for three-phase current, comprising first, second and third primary windings and corresponding first, second and third secondary windings arranged for the three phases respectively, and first and second electrostatic screens between the first primary and secondary windings, third and fourth electrostatic screens between the second primary and secondary windings and fifth and sixth electrostatic screens between the third primary and secondary windings wherein the first, third and fifth electrostatic screens are electrically interconnected and the second, fourth and sixth electrostatic screens are electrically interconnected.

24. The inverter system, comprising three individual and isolated transformers as claimed in claim 1, wherein primary windings of the transformers are delta connected and arranged to be fed from a three-phase inverter.

25. The inverter system as claimed in claim 24, wherein the secondary toroidal closed magnetic circuits of the three individual and isolated transformers are interconnected such that each secondary toroidal closed magnetic circuit of a respective transformer is star connected and provides an input to a six pulse rectifier.

26. An inverter system comprising
a transformer comprising:
a primary winding;
a secondary winding;
a first electrostatic screen located between the primary winding and the secondary winding and most proximate to the primary winding; and
a second electrostatic screen located between the primary winding and the secondary winding and most proximate to the secondary winding, wherein the first electrostatic screen is electrically connectable by a first lossy impedance to a power supply electrically connectable to the primary winding and the second electrostatic screen is electrically connectable by a second lossy impedance to a load electrically connectable to the secondary winding;
an inverter including output ports electrically coupled to the primary winding via the first inductance forming a common mode choke between the inverter and the primary winding; and
at least one rectifier electrically coupled across the secondary winding of the transformer, wherein the second electrostatic screen is electrically coupled to the at least one rectifier via the second impedance such that a second stray capacitance between the secondary winding and the second electrostatic screen flows through the second impedance and the at least one rectifier, wherein the second impedance is sufficiently lossy that substantially all of the energy associated with the second stray current is dissipated in the second impedance.

27. The inverter system as claimed in claim 26, including a monitor resistance connected in series with a load electrically coupled to the secondary winding of the transformer to monitor a current passing through the load, and at least one of the first and second electrostatic screens substantially prevents a first stray current which passes thorough a first stray capacitance between the primary winding and the first electrostatic screen and a second stray current which passes through a second stray capacitance between the secondary winding and the second electrostatic screen, respectively, from also passing through the monitor resistance.

28. An inverter system comprising:
a transformer comprising:
a primary winding;
a secondary winding;
a first electrostatic screen located between the primary winding and the secondary winding and most proximate to the primary winding; and
a second electrostatic screen located between the primary winding and the secondary winding and most proximate to the secondary winding,
an inverter with input ports electrically connectable to a power supply and output ports electrically coupled to the primary winding of the transformer; and
at least one rectifier electrically coupled across the secondary winding and electrically connectable to a load;
wherein the first electrostatic screen is electrically coupled by a first lossy impedance to an input port of the inverter such that a first stray current flowing through a first stray capacitance between the primary winding and the first electrostatic screen flows through the first impedance to the inverter and the second electrostatic screen is electrically coupled by a second lossy impedance to the at least one rectifier such that a second stray current flowing through a second stray capacitance between the secondary winding and the secondary electrostatic screen flows through the second impedance and the at least one rectifier, and wherein the first and second lossy impedances are sufficiently lossy that substantially all energy associated with a stray current flowing therethrough is dissipated therein.

* * * * *